(12) United States Patent
Grepaly et al.

(10) Patent No.: US 6,817,082 B2
(45) Date of Patent: Nov. 16, 2004

(54) RUBBER HOSE WITH OUTER ARMOURING AND PROCESS OF PRODUCING THE SAME

(75) Inventors: Istvan Grepaly, Budapest (HU); Jozsef Kiraly, Toszeg (HU); Laszlo Nacsa, Algyo (HU); Tibor Nagy, Budapest (HU); Imre Fustos, Algyo (HU); Jeno Kotai, Szeged (HU)

(73) Assignee: Phoenix Rubber Gumiipari Kft., Szeged (HU)

( * ) Notice: Subject to any disclaimer, the term of this patent is extended or adjusted under 35 U.S.C. 154(b) by 279 days.

(21) Appl. No.: 10/104,632

(22) Filed: Mar. 22, 2002

(65) Prior Publication Data

US 2002/0189698 A1 Dec. 19, 2002

(30) Foreign Application Priority Data

Mar. 23, 2001 (HU) .............................................. 0101168

(51) Int. Cl.[7] .......................... B21D 39/00; F16L 11/00
(52) U.S. Cl. ......................................... 29/516; 138/135
(58) Field of Search .......................... 29/516, 520, 237; 138/135, 172; 72/368

(56) References Cited

U.S. PATENT DOCUMENTS

| | | | | |
|---|---|---|---|---|
| 826,353 A | * | 7/1906 | Painton | 138/135 |
| 1,809,874 A | * | 6/1931 | Stone | 138/135 |
| 3,251,612 A | * | 5/1966 | Webbe | 285/47 |
| 3,623,513 A | * | 11/1971 | Dinkelkamp | 138/135 |
| 3,799,587 A | * | 3/1974 | Chevalier et al. | 29/516 |
| 4,275,769 A | * | 6/1981 | Cooke | 138/109 |
| 6,016,847 A | * | 1/2000 | Jung et al. | 138/135 |
| 6,324,742 B1 | * | 12/2001 | Odanaka | 29/516 |
| 6,354,332 B1 | * | 3/2002 | Burkhardt et al. | 138/135 |
| 6,513,552 B1 | * | 2/2003 | Shepherd | 138/135 |

* cited by examiner

*Primary Examiner*—David P. Bryant
(74) *Attorney, Agent, or Firm*—Duane Morris LLP

(57) ABSTRACT

A rubber hose provided with an outer metal armouring and a vulcanised and/or adhesively bonded coupling, in particular a flexible rubber hose provided with reinforcing plies, wherein the armouring is constituted by a flexible metal stripwound metalpipe with an interlocked profile (7, 9, 10, 15, 16) which is spliced at least from tow sections and fits with a minimal gap on the hose below.

19 Claims, 2 Drawing Sheets

RUBBER HOSE WITH OUTER ARMOURING AND PROCESS OF PRODUCING THE SAME

Figure 1:
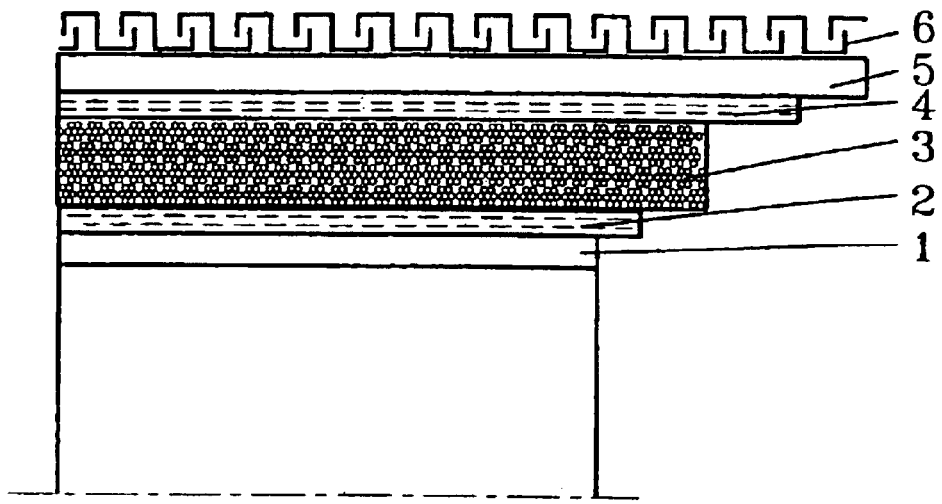

The invention relates to a rubber hose provided with an outer metal protection, a so-called armouring, and -a vulcanised and/or adhesively bonded coupling, in particular the invention relates to a flexible rubber hose provided with reinforcing plies and a process of producing the same.

It is known that high-pressure flexible pipes and hoses should be often provided with an outer armouring in order to achieve an outer mechanical protection. Therefore, various designs have become known and used all over the world.

Most high-pressure rubber hoses having a relatively large diameter are provided with an adhesively bonded coupling before vulcanisation. Such constructions have been described in the following Hungarian Pat. Nos. 157 310, 168 837, 176 336, 206 404, 207 150, 209 627, and 218 334.

When an outer armouring is required a so-called "open-profile flexible stripwound metalpipe" is wound on the hose after vulcanisation and fastened at the couplings. A drawback of this method is that the damaged, cracked flexible stripwound metalpipe can wind off easily from the hose and the protection is lost.

According to another known method, a flat steel profile with a circular segment or rectangular cross section is wound on the hose with a small pitch. This operation can be easily carried out but the damaged steel profile unwinds even more easily than the open-profile flexible stripwound metalpipe. A further drawback is that it does not cover the hose surface gap-free, therefore, it does not protect the hose sufficiently from piercing and cutting actions.

The above drawbacks can be eliminated by using an outer stripwound metalpipe with an interlocked profile ("interlocked flexible stripwound metalpipe"). This type of flexible stripwound metalpipe has long been known, see, for example, Gumiipari Kézikönyv (Rubber Handbook; in Hungarian), TAURUS OMIKK, Vol. II, p. 669. This solution can be easily used if the hose is vulcanised without coupling and then the flexible stripwound metalpipe, which has been cut to size previously, is pulled on the hose and finally the coupling is mounted.

However, if the coupling should be mounted before vulcanising the hose this simple method cannot be used as the outer diameter of the coupling is always significantly larger than that of the hose body, thus, an interlocked flexible stripwound metalpipe fitting tight on the hose body can not be applied after vulcanisation.

It is noted that GB Pat. No. 2 0510297 describes a hose whose outer cover and inner layer are both made from S or Z profiles, however, both the construction of these hoses and the task of the said layers differ from the discussed hose assemblies and from the outer layer providing outer mechanical protection discussed by us. The above hose is not made from rubber, thus, there is no vulcanisation step in its manufacturing process.

Therefore, according to the prior art, an outer interlocked flexible stripwound metalpipe armouring could not have been used when the coupling was mounted before vulcanisation.

Therefore, the object of the invention is to develop an assembly with the application of the said interlocked flexible stripwound metalpipe and a process for the production of the said hoses.

In accordance with the invention it has been discovered that the diameter of an interlocked flexible stripwound metalpipe which is pre-fabricated with the given diameter can be modified by torsion. It is especially easy to change the diameter of the interlocked flexible stripwound metalpipe if relatively short—a few meters long—sections are used which are spliced on the hose after achieving the required diameter.

Therefore, the main feature of the hose assembly according to the invention, which is provided with an outer metal armouring and a vulcanised and/or adhesively bonded coupling, is that the armouring is constituted by a flexible stripwound metalpipe with an interlocked profile which is spliced at least from two sections and fits with a minimal gap on the hose below.

The main feature of the process according to the invention is that flexible stripwound metalpipes with an interlocked profile, comprising two or more sections, are pulled on the hose, the flexible stripwound metalpipe is subjected to a torsion, thus, the gap between the hose and the flexible stripwound metalpipe is reduced to a minimum, the flexible stripwound metalpipe sections are spliced and the flexible stripwound metalpipe ends are fastened to the hose couplings, if desired.

Preferably, the flexible stripwound metalpipe sections are pulled on an unvulcanised hose body which is provided partially with a rubber cover and also a wrap, if desired, before mounting one or both couplings.

It is also preferable if at least two of the flexible stripwound metalpipe sections have different diameters or a flexible stripwound metalpipe can be deformed by torsion so that the diameters will allow the flexible stripwound metalpipes to slip into each other.

According to a preferable embodiment of the invention, after pulling the flexible stripwound metalpipe sections on the hose, the coupling or couplings are mounted, the rubber cover is applied, a wrap is provided, if desired, and the hose is vulcanised.

The wrap can be first removed from the hose section freed by the overlapping of the flexible stripwound metalpipes and then it is removed gradually from the other parts of the hose by displacing the flexible stripwound metalpipe sections along the hose body.

During a possible application of the process according to the invention, flexible stripwound metalpipe sections having an inner diameter larger than the largest diameter above the coupling are pulled on the finished vulcanised hose.

In what follows, in order to facilitate understanding, the invention is described with reference to figures and examples without limiting the scope of the invention.

Figure 2:
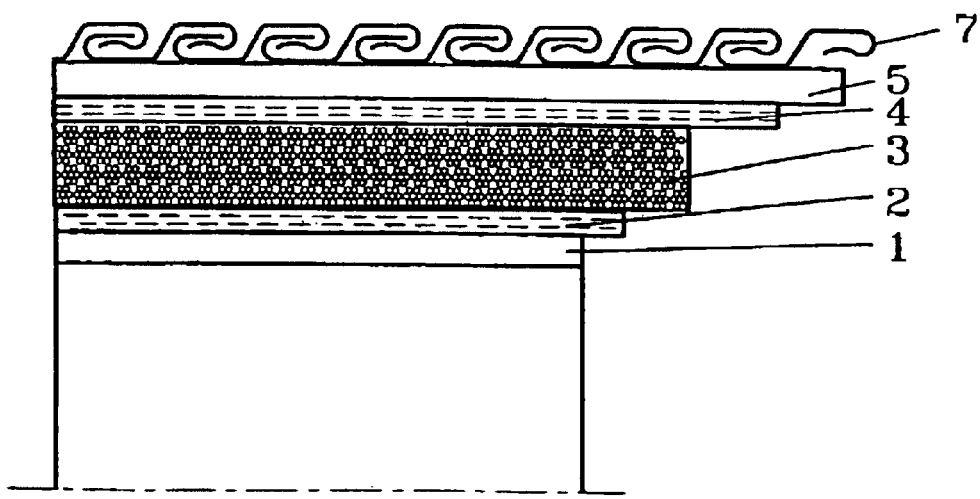
Figure 3:
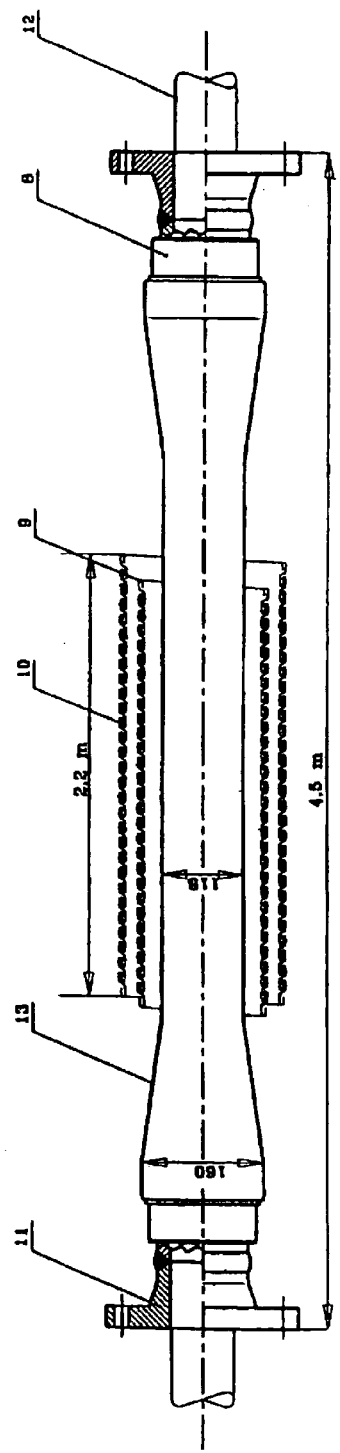
Figure 4:
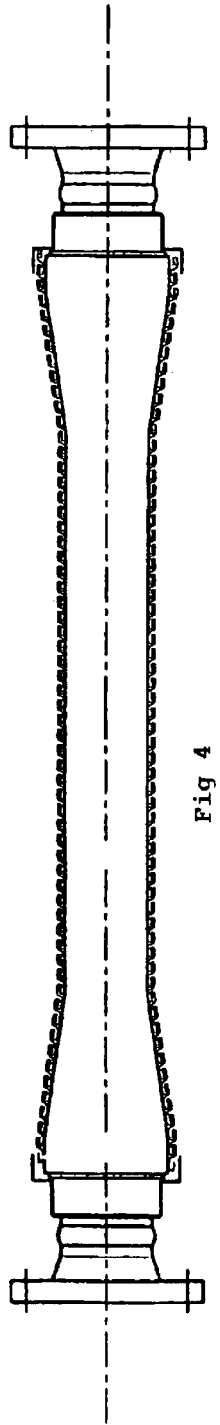
Figure 5:
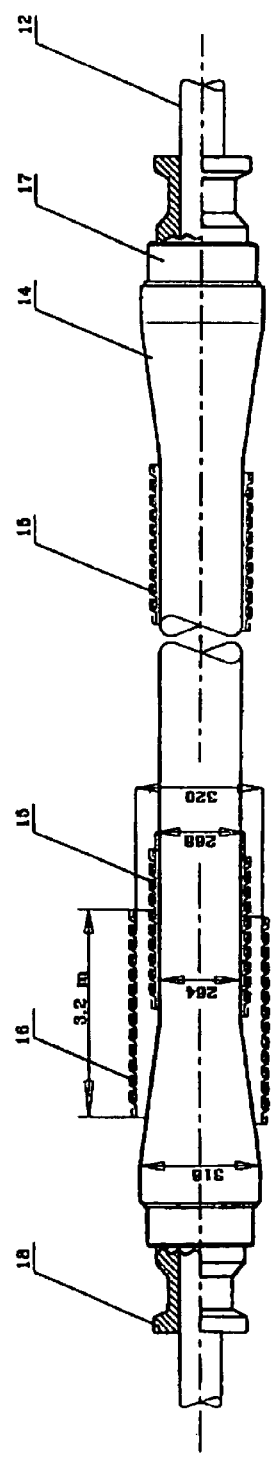

FIG. 1 is a sectional view of a known embodiment;
FIG. 2 is a cross-section of the hose construction according to the invention;
FIGS. 3, 4, and 5 illustrate the hose according to the invention in different phases of the manufacturing process.

With reference to FIG. 1, a known embodiment is depicted where an open-profile flexible stripwound metalpipe is wound on the hose and fastened at the coupling. Rubberised carcasses 2 are laid above rubber or plastic lining 1. The main reinforcing plies are steel wires 3 with embedding rubber 4 between them. The hose is protected from outside by fabric-reinforced rubber cover 5 and an outer open-profile flexible stripwound metalpipe armouring 6.

With reference to FIG. 2, the hose construction according to the invention is shown, where the structural elements designated with reference numbers 1 to 5 are the same as those above while the outer armouring is constituted by interlocked flexible stripwound metalpipe 7 instead of open flexible stripwound metalpipe 6.

The process according to the invention is illustrated by FIGS. 3 to 5 and the following examples.

EXAMPLE 1

A 4.5 m long hose with an inner diameter of 76 mm and an operating pressure of 34.5 MPa is produced. The hose is provided with a built-in flanged coupling and an interlocked flexible stripwound metalpipe armouring. The finished product is shown in FIG. 2, while its construction can be followed in FIGS. 3 and 4.

The initial steps of the hose construction are performed in a usual way, namely, rubber lining 1 is applied on mandrel 12 having a diameter of 72 mm, then rubberised carcass 2 and wire plies 3 with embedding rubber 4 between them are applied. Wire plies 3 are bound down at both hose ends and cut to size and then coupling 8 is attached to one hose end and is fixed to the hose body with epoxy resin. The hose is provided with a cover, except the end without coupling, where the cover is formed in a stepped fashion. The section provided with cover is wrapped with polyamide textile strips.

The outer diameter of the wrapped hose is 118 mm at the cylindrical section and 160 mm above the mounted coupling; the latter decreases conically to 118 mm from the end of the coupling. A 2.2 m long interlocked flexible stripwound metalpipe 7 with an inner diameter of 120 mm and an outer diameter of 132 mm is pulled on the hose and then an other interlocked flexible stripwound metalpipe 10, having the same length of 2.2 m and a—larger—inner diameter of 134 mm and outer diameter of 146 mm, is applied.

Flexible stripwound metalpipes 9 and 10 with the size required for overlapping can be formed by deforming the basic flexible stripwound metalpipes by torsion.

Flexible stripwound metalpipe 9 is overlapped by flexible stripwound metalpipe 10 in order to allow the other hose coupling to be mounted. Then the second coupling 11 is mounted, the cover is finished and the polyamide wrap is wound. This phase is illustrated by FIG. 3.

After the above construction operation, the hose is vulcanised in the usual way.

After vulcanising, the polyamide wrap is wound off from the half of the hose starting from the coupling, flexible stripwound metalpipes 9 and 10 are displaced above the cleaned section, and the polyamide wrap is wound off from the second half of the hose as well. Flexible stripwound metalpipe 10 is displaced towards coupling 8 and the freed flexible stripwound metalpipe 9 is expanded by applying a torsion in the forward direction so that it can be pulled on the section with a diameter of 160 mm above the second coupling 11. Flexible stripwound metalpipe 10 on the same side as coupling 8 is subjected to the same operation. Flexible stripwound metalpipe 9 is fastened to the second coupling 11 and subjected to a torsion in the backward direction and then the gap between flexible stripwound metalpipe 9 and hose 13 is reduced to a minimum. The free end of flexible stripwound metalpipe 9 is spliced to flexible stripwound metalpipe 10 and the application of the torsion in the closing direction is continued. Flexible stripwound metalpipe 10 is fastened to coupling 8 and the hose is pulled off from mandrel 12. The hose made in this manner is illustrated in FIG. 4.

EXAMPLE 2

A 30.5 m long hose with an inner diameter of 200 mm and an operating pressure of 210 bars is produced. The hose is provided with a coupling with a hub and an interlocked flexible stripwound metalpipe armouring.

Until the wires are cut to size, the hose is constructed by a process being analogous to that described in Example 1. The medium section of hose 14 is provided with a cover and wrapped tightly with a polyamide textile strip. The sections required for mounting the two couplings remain free. The outer diameter of the hose body obtained in this manner is 264 mm. Eight 3 m long interlocked flexible stripwound metalpipes 15 with an inner diameter of 268 mm and an outer diameter of 284 mm are pulled on the hose and two 3.2 m long flexible stripwound metalpipes 16 with an inner diameter of 320 mm are pulled thereon. Then couplings 17 and 18 are attached and bonded with epoxy resin. The cover is applied and is wrapped with textile strips. The outer diameter above the coupling is 318 mm together with the wrap. FIG. 5 illustrates this phase. The hose made in this manner is vulcanised in a steam boiler.

The polyamide wrap is removed from the two couplings and the neck section and, after displacing the flexible stripwound metalpipe sections, it is gradually removed from the freed hose body. Then one of the interlocked flexible stripwound metalpipes 16 is drawn on coupling 18 and fastened thereto and the gap between hose 14 and flexible stripwound metalpipe 16 is reduced to a minimum by applying a torsion in the closing direction. The torsion in the closing direction is continued which leads to splicing additional flexible stripwound metalpipe sections on the part produced previously and then the construction of the hose is finished and the last flexible stripwound metalpipe section 16 is fastened to coupling 17.

EXAMPLE 3

The same hose as the one described in Example 2 is produced. The process differs from Example 2 because before attaching the coupling, only the eight 3 m long flexible stripwound metalpipes 15 with an inner diameter of 268 mm are applied and the additional two 3.2 m long flexible stripwound metalpipes with an inner diameter of 320 mm are pulled thereon only after mounting couplings 17 and 18, vulcanising hose 14 and removing the polyamide wrap.

EXAMPLE 4

The same hose as those described in Examples 2 and 3 is produced. The process differs from those disclosed in the previous examples in that the hose is vulcanised—in a way usually followed when similar hoses are manufactured—only after mounting both couplings, providing the cover and wrapping the polyamide strip. The strip is removed from the vulcanised hose and a 4 m long interlocked flexible stripwound metalpipe 16 with an inner diameter of 320 mm is pulled thereon. Flexible stripwound metalpipe 16 is fastened to coupling 18 and the gap between hose 14 and flexible stripwound metalpipe 16 is reduced to a minimum by applying a torsion in the closing direction. An additional flexible stripwound metalpipe 16 is spliced thereon and the operation is repeated until the entire rubberised cover of hose 14 is applied and finally the flexible stripwound metalpipe is fastened to coupling 17.

What is claimed is:

1. A process for producing a hose, wherein flexible stripwound metalpipes with an interlocked profile, comprising two or more sections, are pulled on the hose, the flexible stripwound metalpipe is subjected to a torsion, thus the gap between the hose and the flexible stripwound metalpipe is reduced to a minimum, the flexible stripwound metalpipe sections are spliced and the flexible stripwound metalpipe ends are fastened to the hose couplings, if desired.

2. The process according to claim 1, flexible stripwound metalpipe sections having an inner diameter larger than the largest diameter above the coupling are drawn on the finished vulcanized hose.

3. The process according to claim 1, wherein the flexible stripwound metalpipe sections are drawn on an unvulcanised hose body which is provided partially with a rubber cover and also a wrap, if desired, before mounting one or both couplings.

4. The process according to claim 3, wherein at least two of the flexible stripwound metalpipe sections have different diameters or a flexible stripwound metalpipe can be deformed by torsion so that the diameters will allow the flexible stripwound metalpipes to slip into each other.

5. The process according to claim 4, wherein the wrap is first removed from the hose section freed by the overlapping of the flexible stripwound metalpipes and then it is removed gradually from the other parts of the hose by displacing the flexible stripwound metalpipe sections along the hose body.

6. The process according to claim 4, wherein after pulling the flexible stripwound metalpipe sections on the hose, the coupling or couplings are mounted, the rubber cover is applied, a wrap is provided, if desired, and the hose is vulcanised.

7. The process according to claim 6, wherein the wrap is first removed from the hose section freed by the overlapping of the flexible stripwound metalpipes and then it is removed gradually from the other parts of the hose by displacing the flexible stripwound metalpipe sections along the hose body.

8. The process according to claim 3, wherein after pulling the flexible stripwound metalpipe sections on the hose, the coupling or couplings are mounted, the rubber cover is applied, a wrap is provided, if desired, and the hose is vulcanised.

9. The process according to claim 8, the wrap is first removed from the hose section freed by the overlapping of the flexible stripwound metalpipes and then it is removed gradually from the other parts of the hose by displacing the flexible stripwound metalpipe sections along the hose body.

10. A process for producing a rubber hose with reinforcing plies provided with an outer metal armouring and one of a vulcanised and adhesively bonded coupling, wherein the armouring is constituted by a flexible metal stripwound metalpipe with an interlocked profile (7, 9, 10, 15, 16) which is spliced at least from two sections and fits with a minimal gap on the hose below, the process comprising:

pulling flexible stripwound metalpipes on a rubber hose, the flexible stripwound metalpipes having an interlocked profile comprising at least two sections;

subjecting the flexible stripwound metalpipe to a torsion, thereby reducing the gap between the hose and the flexible stripwound metalpipe to a minimum; and splicing the flexible stripwound metalpipe sections.

11. The process according to claim 10, further comprising fastening the flexible stripwound metalpipe ends to hose couplings.

12. The process according to claim 10, wherein flexible stripwound metalpipe sections having an inner diameter larger than the largest diameter above the coupling are drawn on the finished vulcanized hose.

13. The process according to claim 10, wherein the flexible stripwound metalpipe sections are drawn on an unvulcanised hose body which is provided partially with a rubber cover and also a wrap, if desired, before mounting one or both couplings.

14. The process according to claim 13, wherein at least two of the flexible stripwound metalpipe sections have different diameters or a flexible stripwound metalpipe can be deformed by torsion so that the diameters will allow the flexible stripwound metalpipes to slip into each other.

15. The process according to claim 14, wherein the wrap is first removed from the hose section freed by the overlapping of the flexible stripwound metalpipes and then it is removed gradually from the other parts of the hose by displacing the flexible stripwound metalpipe sections along the hose body.

16. The process according to claim 14, wherein after pulling the flexible stripwound metalpipe sections on the hose, the coupling or couplings are mounted, the rubber cover is applied, a wrap is provided, if desired, and the hose is vulcanised.

17. The process according to claim 16, wherein the wrap is first removed from the hose section freed by the overlapping of the flexible stripwound metalpipes and then it is removed gradually from the other parts of the hose by displacing the flexible stripwound metalpipe sections along the hose body.

18. The process according to claim 13, wherein after pulling the flexible stripwound metalpipe sections on the hose, the coupling or couplings are mounted, the rubber cover is applied, a wrap is provided, if desired, and the hose is vulcanised.

19. The process according to claim 18, wherein the wrap is first removed from the hose section freed by the overlapping of the flexible stripwound metalpipes and then it is removed gradually from the other parts of the hose by displacing the flexible stripwound metalpipe sections along the hose body.

* * * * *